United States Patent Office 3,085,069
Patented Apr. 9, 1963

3,085,069
PROCESS FOR PURIFYING TETRAETHYLLEAD COMPOSITIONS
Edwin L. Mattison, Newark, Del., assignor to E. I. du Pont de Nemours and Company, Wilmington, Del., a corporation of Delaware
No Drawing. Filed Jan. 5, 1959, Ser. No. 784,891
10 Claims. (Cl. 252—386)

This invention relates to a process for purifying tetraethyllead compositions and particularly for removing suspended sludge and haze-forming impurities from tetraethyllead and tetraethyllead antiknock blends.

Tetraethyllead is manufactured commercially by alkylating a lead-sodium alloy with ethyl chloride. The purified product is blended with other agents according to specifications relating to its use, to produce tetraethyllead antiknock blends for automotive and aviation fuels. Such blends are comprised generally of tetraethyllead, halohydrocarbon scavening agents for lead in combustion processes, a dye for marking the particular blend for identification, and an inert solvent oil such as kerosene.

The preparation of acceptably pure tetraethyllead and its blended products is not without problems. Normally, the tetraethyllead produced in the alkylation reaction is separated from the reaction mass by steam distillation. The steam-distilled product is usually impure, containing finely divided suspended materials, e.g. metallic lead, objectionable sludge-forming impurities, such as organo derivatives of bismuth (which metal is generally present in the lead used in such process), ethyl lead chlorides and oxides, and a variety of other metallic impurities in trace quantities inherently present in the lead.

Various methods may be employed to remove the impurities and produce a product having acceptable purity for the preparation of the blended antiknock compositions. Suspended matter and the particularly objectionable soluble organo-bismuth impurities may be removed and destroyed by a variety of methods, as described in United States Patents Nos. 2,400,383; 2,407,261; 2,407-262; 2,407,263; 2,407,307; 2,426,789; 2,432,321; and 2,440,810. For example, the steam-distilled product may be blown with air in the presence of water or in the presence of water containing a sludge deactivating agent and then separated by decantation from the aqueous phase and the sludge-like products formed in the aeration process.

The thus purified product, while substantially free of the hazardous organo-metallic impurities, normally contains small but troublesome quantities of particulate and gelatinous inorganic material, as a fine suspension or smokey haze. This material is composed largely of lead, lead oxide, lead salts, iron oxide from the equipment, and bismuth oxide, and in addition invariably contains inorganic compounds of a variety of other metals inherently present in trace quantities in the purchased lead for the alkylation process. The suspended hazy matter is difficult to remove by filtration, unless costly special facilities are employed. It tends to pass through ordinary filter media and to clog fine filters, resulting in inefficient or very slow filtration. Carried over to the blending operation, it results in cloudy blends.

Further, it has been found that cloudy blends are produced even if filtered, haze-free tetraethyllead is used for their preparation. This new cloudiness or haze may be attributed in part to impurities in the other blending ingredients, such as the small quantities of benzene insolubles that may be present in the dyes used to mark the blends for identification, and in part to the interaction of the tetraethyllead product with the scavengers. For example, mixing the tetraethyllead product and ethylene dibromide results in the immediate appearance of a haze, analysis of which shows that it contains lead and bromine and consists at least in part of triethyllead bromide.

In the industry cloudiness in the antiknock blends is associated with instability and poor quality and it is therefore desirable to provide haze-free blended products. Efficient filtration of the tetraethyllead and/or its blends, simple as it may appear, is not a practical solution to this problem because of the technical difficulties and relatively high cost involved in such operation as indicated above.

It is an object of this invention to provide a new and improved method for removing suspended sludge and haze-forming impurities from tetraethyllead and tetraethyllead antiknock blends. A particular object is to provide such a process which comprises washing the impure tetraethyllead compositions with aqueous solutions which are particularly effective to dissolve the impurities and remove them from said compositions. A further object is to provide such a process which is easy, simple and economical to operate. Other objects will appear hereinafter.

The above and other objects are accomplished by this invention wherein a tetraethyllead composition, which is of the class of tetraethyllead and tetraethyllead antiknock blends and which contains suspended sludge and/or haze-forming impurities, is mixed with at least 1% by weight of an aqueous solution of at least one hydroxy acid compound from the group consisting of water-soluble hydroxy carboxylic acids each of which consists of carbon, hydrogen and oxygen and contains at least 1 hydroxyl group and 1 to 3 carboxyl groups each of which is attached directly to a saturated acyclic carbon atom, at least one hydroxyl group being in the alpha position relative to a carboxyl group, and alkali metal salts of said acids, said aqueous solution containing from about 0.01% to about 5.0% by weight of said hydroxy acid compound; settling said mixture to form an upper aqueous layer and a lower layer of purified tetraethyllead composition; and then separating said layers.

By this process, tetraethyllead compositions are obtained which are substantially clear and free of sludge and haze-forming impurities and are suitable for use as antiknock agents and other uses without redistillation or other treatment. The aqueous layer is also substantially free of precipitated sludge or solid matter and there is no collection of solids at the interface of the layers. Thus, the aqueous solutions of the hydroxy carboxylic acids of this invention are remarkably effective to dissolve the sludge, haze and haze-producing substances present in the tetraethyllead compositions, and provide a simple solution to a difficult purification problem on a commercial scale. The aqueous hydroxy acid layer, remaining after such treatment, contains, in soluble form, compounds of such metals as Pb, Fe, Bi, Li, Na, Mg, Ca, Sr, Ba, Zn, Al, Si, Ag, Cu, Ni, and Mn, that may have been present as impurities in the tetraethyllead composition.

The tetraethyllead compositions, which are to be treated by the process of this invention, comprise (1) tetraethyllead that has been steam distilled and, preferably, has been subjected to oxidizing conditions, as by aeration, and (2) tetraethyllead antiknock blends. Some tetraethyllead is used for purposes other than as an antiknock agent and some may be sold to oil refiners who desire to compound their own antiknock blends. In such cases and also when the tetraethyllead contains unusually large amounts of impurities, it is usually desirable to treat the tetraethyllead itself by the process of this invention during or after subjecting it to oxidizing conditions. Most of the tetraethyllead is marketed and used as antiknock blends which are blends of tetraethyllead with up to 40% by weight of halohydrocarbon lead scavenging agents, small amounts of characteristic dyes to identify the particular blend and a minor proportion of a blending agent which conventionally is an inert solvent oil, usually kerosene. Even if the tetraethyllead has been purified previously by the process of this invention or by other methods, a haze is formed when the tetraethyllead is used to prepare such antiknock blends. Therefore, in order to provide antiknock blends of the highest quality, it is preferred to treat such antiknock blends by the process of this invention regardless of the prior history of the tetraethyllead employed therein.

The halohydrocarbon scavenging agents, as a class, are well known and a great many of them have been disclosed in the prior art. Conventionally, they are blended with the tetraethyllead in a proportion sufficient to provide at least two atoms of halogen for each atom of lead present in the tetraethyllead. In the commercial tetraethyllead antiknock blends, either or both of ethylene dichloride and ethylene dibromide are most commonly used as the scavenging agents. Also, the tetraethyllead antiknock blends most commonly in use are of two general types—"Aviation Mix" for use in fuel for aircraft, and "Motor Mix" for use in fuel for automobiles. Normally, "Aviation Mix" contains ethylene dibromide as the sole lead scavenging agent in an amount to furnish at least two bromine atoms for each atom of lead. At present, "Motor Mix" usually contains both ethylene dichloride and ethylene dibromide in proportions to furnish about two atoms of chlorine and about one atom of bromine, respectively, for each atom of lead. Blends, containing different proportions of these ethylene dihalides and containing various proportions of other halohydrocarbon scavenging agents, are also available on the market. Such various types of tetraethyllead antiknock blends may be treated by the process of this invention, during or after the blending operation.

The hydroxy acids, which are to be used as the free acids or as their alkali metal salts in the process of this invention, are those hydroxy carboxylic acids which are water-soluble, which consist of the elements carbon, hydrogen and oxygen, which contain at least 1 hydroxyl group and 1 to 3 carboxyl groups, and in which each hydroxyl group and each carboxyl group is attached directly to a saturated acyclic carbon atom and at least one hydroxyl group is in the alpha position relative to a carboxyl group, i.e. at least one carbon atom of the acid must be bonded directly to both an —OH and a —COOH group so that the acid contains at least one

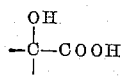

grouping. Those hydroxy carboxylic acids, in which each hydroxyl group is farther removed from any carboxyl group, e.g. in the beta position, are either ineffective or much less effective in the process of this invention. However, when the hydroxy acid contains 2 or more hydroxyl groups, it is only necessary that one of them be in the alpha position, it being permissible for any or all of the other hydroxyl groups to be positioned farther from all carboxyl groups.

Provided that the above conditions are met, the hydroxy acid may contain aryl (aromatic hydrocarbon) and other cyclic hydrocarbon substituents, such as phenyl, alkylphenyl and cyclohexyl groups, and olefinic double bonds. However, it is preferred that the acids be saturated (free of olefinic and acetylenic bonds), acyclic (free of cyclic groups) hydroxy carboxylic acids. The hydroxy acid also may contain keto, aldehyde and ether groups. The term hydroxy carboxylic acid refers to the form of the acid in aqueous solution and includes those acids which, in the dry state, may exist in dehydrated form as alpha-keto carboxylic acids, e.g. diketosuccinic acid, but which are converted to the alpha hydroxy carboxylic acids, e.g. tetrahydroxysuccinic acid, upon solution in water. It is further preferred that the hydroxy acid contain 2 to 3 carboxyl groups, particularly citric acid, and/or 2 to 5 hydroxyl groups. A particularly effective class of hydroxy acids are the sugar acids which are water-soluble and have at least one hydroxyl group in the alpha position relative to a carboxyl group. The sugar acids are well known compounds which are obtained by oxidizing sugars such as glucose, lactose, galactose, and the like. In general, they contain at least 4 hydroxyl groups and 1 to 2 carboxyl groups. In some cases, they exist in the form of lactones in the dry state but are converted to the hydroxy acids in dilute aqueous solution.

Representative hydroxy carboxylic acids within this invention, with their common or popular names sometimes indicated in parentheses, are Hydroxyacetic (glycolic) acid
Alpha-hydroxypropionic (lactic) acid
Alpha-hydroxybutyric acid
Alpha-hydroxyisobutyric acid
Alpha-hydroxyvaleric acid
Alpha-hydroxyisovaleric acid
Alpha-hydroxyhexanoic acid
Phenyl-hydroxyacetic (mandelic) acid
1,2-dihydroxypropionic (glyceric) acid
Alpha-hydroxysuccinic (malic) acid
2-hydroxy-2-methylbutanedioic (citramalic) acid
2,2'-dihydroxysuccinic (tartaric) acid
Tetrahydroxysuccinic acid
2-hydroxy-1,2,3-propanetricarboxylic (citric) acid
2,3,4,5,6-pentahydroxyhexanoic (gluconic) acid
2,3,4,5-tetrahydroxyadipic (saccharic) acid
Isosaccharic acid
Saccharolactic (mucic) acid.

The hydroxy carboxylic acids may be employed as the free acids or as their alkali metal salts, such as the sodium, potassium and lithium salts, including the partially and fully neutralized salts, and in the presence of up to about 2 moles of excess alkali. However, the free acids are materially more effective than their alkali metal salts and are preferred.

The process is simple and easy to operate. The aqueous solution of the hydroxy acid compound, free acid or alkali metal salt, is mixed with the tetraethyllead composition so as to obtain intimate contact between them, particularly to obtain intimate contact of the aqueous solution with the impurities in the tetraethyllead composition, settling the mixture to form an upper aqueous layer and a lower layer of purified tetraethyllead composition, and then separating the layers, as by drawing off the lower layer of tetraethyllead composition or decanting off the aqueous layer.

For efficient operation, good contact should be established between the hydroxy acid solution and the suspended matter in the tetraethyllead composition. This may be achieved by good mixing, as by agitation. The tetraethyllead compositions have a density considerably greater than that of the aqueous treating solution. Therefore, there may be used to advantage the types of mixing which are known to the art for mixing materials of considerably different densities, such as turbulent flow, passing the materials through the center of a centrifugal pump, circulating the materials externally between the bottom and the top of the mixing tank, and the like. One form of apparatus, suitable for use in carrying out the purification of tetraethyllead antiknock blends, is illustrated by Kreimeier and Mattison in their copending application Serial No. 580,842 filed April 26, 1956.

The quantities of the hydroxy carboxylic acid compound and of water may be varied widely, and will depend on the quality of the tetraethyllead composition to be purified, the presence or absence of trace impurities in the other blending ingredients, and on the effectiveness of the particular hydroxy carboxylic acid compound used in solubilizing the sludge and haze-producing substances of the tetraethyllead compositions. Normally, from about 0.01% to about 1.0% by weight of the acid compound based on the tetraethyllead composition will be conveniently employed to provide satisfactory results.

The quantity of water employed should be sufficient to provide a separate aqueous phase and, for convenient handling of the two phase system, should correspond to at least about 1 part per 50 to 100 parts by weight (1–2%) of the tetraethyllead composition. Preferably, in the treatment of tetraethyllead antiknock blends, 1 part of aqueous solution will be used to treat a single charge of about 3 to about 20 parts of the blend, i.e. from about 5% to about 33%. Larger quantities of aqueous solution, e.g. an equal part or more, may be used but obviously the greater the volume of aqueous solution the less the remaining capacity of the treating vessel for the tetraethyllead composition.

When tetraethyllead itself is to be treated, it is preferred that the treatment with the hydroxy acid be effected in the aeration step, i.e. the solution of the hydroxy acid is present while the tetraethyllead is being aerated. In short, the hydroxy acid may replace the addition agents of the prior art methods referred to hereinbefore. In the aerator, it is preferred to employ about equal volumes of raw steam-distilled tetraethyllead and water containing from about 0.01% to about 5.0% by weight of the hydroxy carboxylic acid compound, preferably from about 0.05% to about 5%. By this method, substantially clear tetraethyllead and aqueous phases are produced, in surprising contrast to the prior art methods which produce sludges. This use of an hydroxy acid, such as citric acid, in the aeration step provides for easy and clean separation of the aerated tetraethyllead from the aqueous layer, and, since no water insoluble sludges are formed to collect at the interface, eliminates the time-consuming and costly reworking of the interface layer of tetraethyllead, sludge and water obtained by the prior art methods, for the recovery of its tetraethyllead content. Any free metallic lead that may have been present in the steam-distilled product is now easily removed by filtration and presents little or no fire or explosion hazard. It should be understood that the method of this invention, where it applies to the preparation of haze-free blends, is not limited to the use of tetraethyllead that has been aerated in the presence of the hydroxy carboxylic compound as described above. Rather, any tetraethyllead compound, treated as above or as described in the prior art patents given hereinbefore to convert the soluble organic bismuth to insoluble bismuth compounds, may be used in the method of this invention for the preparation of haze-free blends.

For use in treating tetraethyllead antiknock blends, the aqueous solution will usually contain from about 0.1% to about 5% by weight of the hydroxy carboxylic acid compound, preferably from about 0.25% to about 5%, and such solution will be used to treat from about 3 to about 20 times its weight of the antiknock blend. Such solutions are by no means exhausted after treating such a quantity of the antiknock blend. In the preparation of tetraethyllead antiknock blends, for example, a 0.5% citric acid solution may be used to treat as few as 2 to 4 and as many as 20 to 40 consecutive charges of the blend, each about 10 times the weight of the citric acid solution. Even after such extensive use, the solution may be revitalized merely by incorporating therein an additional quantity of the acid, and reused. Eventually, of course, the accumulation of impurities in the solution of the hydroxy carboxylic acid compound becomes so great that the solution has to be discarded.

The mixing completed, the system is allowed to rest, whereupon it stratifies, with the aqueous layer on top and with little or no emulsion at the interface. Such clean layering of the phases provides the particular advantage of easy and substantially complete recovery of the tetraethyllead composition. Another advantage, provided by the use of the aqueous solutions of this invention, is that any finely divided free lead, that may remain after such treatment, is now readily filterable.

The temperature at which the process is carried out is not critical so long as it is one at which both the tetraethyllead composition and the aqueous hydroxy acid solutions are liquid and which is below the decomposition temperature of such materials alone or together. Satisfactory results are obtained at temperatures of from about 0° to about 50° C., particularly during the preparation of the antiknock blends. For convenience, atmospheric temperatures are preferred.

The tetraethyllead compositions that have been made haze-free by treatment with a hydroxy acid solution may be further treated, as described in the art, by adding a stabilizer to obviate deterioration and the formation of haze under storage conditions. N,N′-di-secondary butyl p-phenylenediamine is a particularly effective well known stabilizer. Usually, not more than from about 0.01% to about 0.1% by weight of this stabilizer based on the tetraethyllead need be incorporated into the tetraethyllead composition for satisfactory results.

The tetraethyllead, used for the preparation of the antiknock mixes (or blends) employed in the examples, had been previously processed as follows:

The steam-distilled product from the ethylation reaction was aerated in the presence of about an equal volume of water, by passing air through the charge while under vigorous agitation, until the formation of sludge was substantially complete, i.e. until a test sample of the aerated material formed less than about 0.002 gram of sludge per 100 ml. of tetraethyllead on further aeration.

In the examples below, the clarity, i.e. freedom from haze, of the tetraethyllead compositions is expressed quantitatively in terms of their ability to transmit light. Test samples were compared in a Cenco-Sheard Photelometer against haze-free controls (prepared by filtering test samples through Whatman No. 5 fluted filter paper). The percent light transmission of each test sample was obtained on multiplying by 100 the ratio of the observed light transmission values (sample to control). Tetraethyllead antiknock compositions, showing at least 90% light transmission, were visually clear and considered to be acceptably free of haze.

In order to more clearly illustrate this invention, prefered modes of practicing it, and advantageous results to be obtained thereby, the following examples are given, in which the proportions employed were by weight and the temperatures were atmospheric, except where specifically indicated otherwise:

*Example 1*

Commercial plant-sized charges of substantially haze-free antiknock blends were prepared as follows:

6,876 lbs. of ethylene dibromide, 7,242 lbs. of ethylene dichloride and 19.5 lbs. of an orange dye, "Du Pont Oil Orange," were added to the blending vessel. Simultaneously, 20 lbs. of citric acid and 4000 lbs. of water were added, followed by 23,670 lbs. of tetraethyllead and sufficient kerosene (692 lbs.) to bring the total weight of the antiknock blend to 38,500 lbs.

The charge was vigorously agitated for one hour and allowed to settle. The resulting two phases were clear and sharply defined.

Samplings of the lower organic layer showed light transmissions equal to 97% that of the filtered control. In contrast, the average percent light transmission of a series of antiknock blends of the same composition, made from the above materials exclusive of water and citric acid, was only 76, i.e. 76% of the light transmission shown by the controls which were filtered samples of the untreated antiknock blends.

The above purified layer of antiknock blend was drawn off, leaving the aqueous layer for treatment of additional charges of the antiknock blend as described in Example 2.

*Example 2*

To the residual aqueous solution of Example 1 was added ethylene dibromide, ethylene dichloride, dye, tetraethyllead and kerosene, as described and in the amounts given in Example 1 and the procedure repeated to produce a visually clear antiknock blend showing 97% light transmission. The layer of antiknock blend was removed, and, to the residual aqueous solution retained in the tank, there was again added additional portions of the above blending ingredients in the quantities given. This procedure was repeated for the preparation of 35 consecutive charges of the antiknock blend, each of which showed a percent light transmission of at least 90.

After the 35th charge, which showed about 90% light transmission after such treatment, an additional 20 lbs. of citric acid was added to the residual aqueous solution, and the procedure was repeated for the preparation and purification of 15 more consecutive charges before the light transmission of the blend being treated fell to about 90% that of the filtered control.

*Example 3*

The procedures of Examples 1 and 2 were repeated to prepare and purify antiknock blends made from the following ingredients:

| | Lbs. |
|---|---|
| Tetraethyllead | 25,915 |
| Ethylene dibromide | 15,057 |
| Dye ("Du Pont Oil Blue A") | 11 |
| Kerosene | 1,217 |

Thirteen consecutive charges, each having a percent light transmission of at least 90, were prepared in the presence of the same citric acid solution. After the 13th charge had been removed, a second addition of 20 lbs. of citric acid was made to the residual aqueous layer which was then used to treat successfully four consecutive charges of the blending ingredients.

*Example 4*

Substantially identical results were obtained by the procedure of the previous Examples 1–3 in preparing antiknock blends from the following ingredients:

| Tetraethyllead | lbs. | 31,825 |
|---|---|---|
| Ethylene dibromide | lbs. | 9,245 |
| Kerosene | lbs. | 930 |
| Red dye | oz. | 8 |

The freshly prepared 0.5% citric acid solution, which was used in the preparation of the first charge, served to treat a total of 20 consecutive charges. An additional 20 lbs. of citric acid was added after the 15th charge.

*Example 5*

500 gram samples of a commercial Aviation Mix containing 61.4% by weight of tetraethyllead, which samples were hazy and showed only 17% light transmission, were agitated for 5 minutes with solutions consisting of 48.5 grams of water and 0.65 gram of one of the hydroxy carboxylic acids listed below. The results follow.

Hydroxy acid: Percent light transmission of the treated blend

| Glycolic | 99 |
|---|---|
| Lactic | 99 |
| Tartaric | 99 |

*Example 6*

Approximately 500 gram samples of an antiknock blend, showing 63% light transmission and composed of 61.4% tetraethyllead, 35.7% ethylene dibromide, 0.03% of a standard blue dye, and 2.88% solvent oil, were agitated with a solution consisting of 50 grams of water and 0.15 gram of one of the acid compounds listed below, until the light transmittance of the layer of antiknock blend had reached a maximum (within 20 minutes). The results are tabulated below:

| | Treated Blend | |
|---|---|---|
| Acid | Percent Light Transmission | Visual Appearance |
| 1. Citric | 99 | clear, no solid at interface. |
| 2. Alpha-hydroxyisobutyric | 94 | Do. |
| 3. Mandelic | 97 | Do. |
| 4. None (water alone) | 88 | sl. haze plus solid at interface. |
| 5. Thioglycolic | 89 | Do. |
| 6. 2-hydroxynaphthoic [1] | 84 | haze+ppt. at interface. |
| 7. Ortho-cresotinic [1] | 64 | Do. |
| 8. 1-hydroxy-4-naphthoxy-acetic [1] | 30 | Do. |

[1] Neutralized with NaOH, since the free acids are incompletely soluble in water.

The acid compounds, 5–8, are included for purposes of comparison and are not within the scope of this invention. The results show that only the acids representative of this invention (1–3) are effective to remove haze from tetraethyllead antiknock blends. It will be noted that water alone is partially effective in this series of experiments. In general, however, the use of water alone affords products having percent light transmissions of the order of 80–88%. Also, replacing the acids of this invention with an organic acid, such as acetic acid, or a mineral acid, such as hydrochloric acid, does not enhance the limited improvement obtainable with water alone.

*Example 7*

A mixture consisting of the following ingredients, in grams,

| Ethylene dibromide | 89.3 |
|---|---|
| Ethylene dichloride | 94.1 |
| Orange dye | 0.25 |
| Tetraethyllead | 307.4 |
| Kerosene | 9.0 |
| Water | 26.0 |
| Citric acid | 0.07 | was agitated for 5 minutes and allowed to settle. The layer of antiknock blend showed 100% light transmission. The untreated control, a mixture of the above ingredients exclusive of water and citric acid, showed only 62% light transmission.

*Example 8*

A mixture consisting of 400 ml. of water, 0.2 gram of citric acid and 400 ml. of raw steam-distilled tetraethyllead was agitated and blown with air as disclosed in United States Patent 2,400,383. The resulting liquid layers were clear with a small quantity of free lead at the interface. The percent light transmission of the tetraethyllead layer was 98%.

When the above experiment was repeated without the hydroxy acid present, the tetraethyllead layer produced was turbid and the system contained a heavy precipitate of bismuth and lead compounds.

Glycolic, lactic and tartaric acids were each successfully substituted for citric acid in the above experiment illustrating the invention. Equally satisfactory results were obtained on employing each of these acids as the sodium salts in quantity corresponding to 5% by weight of the water layer.

*Example 9*

20 grams of tartaric acid was dissolved in 400 ml. of water. 400 ml. of crude (unaerated) tetraethyllead was added and the mixture agitated and aerated (i.e. blown with air) for one hour, then allowed to stand for ½ hour. The tetraethyllead layer was separated from the clear water layer and filtered through a Gooch crucible to remove suspended solids. The quantity of solids collected on the filter amounted to 0.0020 gram per 100 ml. of tetraethyllead. This quantity corresponds to about 1% of the amount obtained when tetraethyllead is aerated in the absence of the hydroxy acid compound.

The above experiment was repeated exactly, except that 19 grams of NaOH was dissolved in the 400 ml. of water along with the 20 grams of tartaric acid before the tetraethyllead was added and the mixture aerated. The tetraethyllead and water layers produced on aeration were completely free of suspended solids.

The results show that tartaric acid, either as the free acid or as the sodium salt in excess alkali, is effective in reducing the quantity of sludge formed from raw steam-distilled tetraethyllead in the aeration process.

*Example 10*

300 ml. samples of impure Aviation Mix of Example 6 were agitated with 100 ml. of a water solution containing 5% by weight of either (1) the free hydroxy acid as indicated below, (2) the sodium salt of the acid (i.e. completely neutralized), or (3) the sodium salt in the presence of 2 molar proportions of NaOH in excess over the salt. The layers were allowed to separate and the light transmittance of the layer of antiknock blend was determined. The results are tabulated below.

| Hydroxy acid compound: | Percent light transmission |
| --- | --- |
| Tartaric acid | 100 |
| Citric acid | 100 |
| Lactic acid | 100 |
| Sodium tartrate | 98 |
| Sodium tartrate+2 moles NaOH | 93 |
| Sodium citrate+2 moles NaOH | 90 |

The results show that the sodium salts are effective in place of the free acids to remove haze from tetraethyllead compositions. The free acids however are significantly superior and are preferred.

*Example 11*

As in Examples 5 and 6, 300 ml. samples of Aviation Mix were stirred for 15 minutes with 50 ml. of water containing 0.3% by weight of each of the compounds tabulated below. The percent light transmission of the treated blend was determined as before.

| Hydroxy acid: | Percent light transmission |
| --- | --- |
| (1) Sodium alpha hydroxy decanoate | 21 |
| (2) Sodium alpha hydroxy laurate | 76 |
| (3) Sodium alpha hydroxy stearate | 79 |
| (4) Hydroxy pivalic acid | 88 |
| (5) Citric acid | 100 |

The hydroxy acid compounds of numbers 1–4 are included for purposes of comparison and do not come within the scope of this invention. Hydroxy pivalic acid is a beta-hydroxy acid having the formula $$HO-CH_2-C(CH_3)_2-COOH$$

and does not have a hydroxyl group in the alpha position relative to a carboxyl group. The free hydroxy acids of numbers 1–3 are insoluble in water. The aqueous solutions of the salts were prepared from equal molar quantities of the respective acids and sodium hydroxide. These salts tended to promote emulsification of the aqueous and organic layers. It is apparent that compounds 1–4 were not effective in this process.

*Example 12*

450 ml. samples of a tetraethyllead Aviation Mix (having the composition described previously), which samples showed only 68% light transmission, were treated with 75 ml. of water containing dissolved therein 0.45% by weight of one of the following hydroxy acids. The percent light transmission of the treated blend is given below.

| Hydroxy acid: | Percent light transmission |
| --- | --- |
| Gluconic | 100 |
| Tetrahydroxysuccinic | 100 |
| Saccharic | 100 |
| Citric | 100 |

Gluconic acid (2,3,4,5,6-pentahydroxyhexanoic acid) and saccharic acid (2,3,4,5-tetrahydroxyadipic acid) are "sugar" acids, readily obtainable from glucose (dextrose, can sugar) by oxidation.

It will be understood that the preceding examples have been given solely for illustrative purposes, and that this invention is not restricted to the specific embodiments described therein. On the other hand, it will be apparent that other hydroxy acids of the specified class may be substituted for those of the examples and that variations may be made in the tetraethyllead compositions treated, in the proportions and concentrations of the materials employed, and in the conditions and techniques used, within the limits set forth in the general description, without departing from the spirit and scope of this invention.

It will be apparent that this invention provides a new and improved process for removing suspended sludge and haze-forming impurities from tetraethyllead compositions. The hydroxy acids of the specified class are far more effective than agents previously proposed for the purpose and have the further advantage of avoiding the formation of sludges and the like normally produced by the agents of the prior art, thereby eliminating costly additional purification treatments. The hydroxy acids are low in cost. The process is economical, easy and simple to operate. Accordingly, this invention constitutes a valuable advance in and contribution to the art.

The embodiments of the invention in which an exclusive property or privilege is claimed are defined as follows:

1. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of at least one water-soluble hydroxy carboxylic acid which consists of carbon, hydrogen and oxygen and contains at least 1 hydroxyl group and 1 to 3 carboxyl groups each of which is attached directly to a saturated acylic carbon atom, at least one hydroxyl group being in the alpha position relative to a carboxyl group, said aqueous solution containing from about 0.01% to about 5.0% by weight of said hydroxy acid; settling said mixture to form an upper aqueous layer and a lower layer of purified tetraethyllead composition; and then separating said layers.

2. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of at least one water-soluble saturated acyclic hydroxy carboxylic acid which consists of carbon, hydrogen and oxygen and contains at least 1 hydroxyl group and 1 to 3 carboxyl groups, at least one hydroxyl group being in the alpha position relative to a carboxyl group, said aqueous solution containing from about 0.01% to about 5.0% by weight of said hydroxy acid; settling said mixture to form an upper aqueous layer and a lower layer of purified tetraethyllead composition; and then separating said layers.

3. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of at least one water-soluble saturated acyclic hydroxy carboxylic acid which consists of carbon, hydrogen and oxygen and contains 1 to 5 hydroxyl groups and 1 to 3 carboxyl groups, at least one hydroxyl group being in the alpha-position relative to a carboxyl group, said aqueous solution containing from about 0.01% to about 5.0% by weight of said hydroxy acid; settling said mixture to form an upper aqueous layer and a lower layer of purified tetraethyllead compositions; and then separating said layers.

4. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of citric acid in a concentration of from about 0.01% to about 5.0% by weight; settling said mixture to form an upper aqueous layer and a lower layer of purified tetraethyllead composition; and then separating said layers.

5. The process for removing normally occurring suspended sludge and haze-forming impurities from a tetraethyllead antiknock blend which contains said impurities, which process comprises mixing said impure tetraethyllead antiknock blend with from about 5% to about 33% by weight of an aqueous solution of citric acid in concentration of from about 0.1% to about 1% by weight; settling said mixture to form an upper aqueous layer and a lower layer of purified tetraethyllead antiknock blend; and then separating said layers.

6. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of tartaric acid in a concentration of from about 0.01% to about 5.0% by weight; settling said mixture to form an upper aqueous layer and a lower layer of purified tetraethyllead composition; and then separating said layers.

7. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of tetrahydroxysuccinic acid in a concentration of from about 0.01% to about 5.0% by weight; settling said mixture to form an upper aqueous layer and a lower layer of purified tetraethyllead composition; and then separating said layers.

8. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of at least one water-soluble sugar acid which consists of carbon, hydrogen and oxygen and contains at least 4 hydroxyl groups and 1 to 2 carboxyl groups, at least one hydroxyl group being in the alpha position relative to a carboxyl group, said aqueous solution containing from about 0.01% to about 5.0% by weight of said sugar acid; settling said mixture to form an upper aqueous layer and a lower layer of purified tetraethyllead composition; and then separating said layers.

9. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of 2,3,4,5,6-pentahydroxyhexanoic acid in a concentration of from about 0.01% to about 5.0% by weight; settling said mixture to form an upper aqueous layer and a lower layer of purified tetraethyllead composition; and then separating said layers.

10. The process for removing normally occurring suspended sludge and haze-forming impurities from a tetraethyllead composition of the class consisting of steam distilled tetraethyllead and tetraethyllead antiknock blends, which composition contains said impurities, which process comprises mixing said impure tetraethyllead composition with at least 1% by weight of an aqueous solution of 2,3,4,5-tetrahydroxyadipic acid in a concentration of from about 0.01% to about 5.0% by weight; settling said mixture to form an upper aqueous layer and a lower layer of purified tetraethyllead composition; and then separating said layers.

References Cited in the file of this patent

UNITED STATES PATENTS

| 2,197,498 | Guthmann | Apr. 16, 1940 |
| 2,400,383 | Bertolette et al. | May 14, 1946 |
| 2,426,789 | Parmelee | Sept. 2, 1947 |
| 2,440,810 | Parmelee | May 4, 1948 |
| 2,465,209 | De Verter | Mar. 22, 1949 |
| 2,479,900 | Calingaert et al. | Aug. 23, 1949 |
| 2,584,017 | Dvorkovitz et al. | Jan. 29, 1952 |
| 2,687,346 | McDonald | Aug. 24, 1954 |
| 2,747,979 | Thompson | May 29, 1956 |
| 2,761,784 | Hall | Sept. 4, 1956 |
| 2,811,429 | Lappin et al. | Oct. 29, 1957 |
| 2,869,993 | Lyben | Jan. 20, 1959 |

OTHER REFERENCES

"Sequestration by Sugar Acids," by Mehltretter et al., article in Ind. and Eng. Chem., December 1953, pp. 2782–2784.

The Versenes, by Bersworth Chem. Co., Technical Bull. No. 2, 1952, p. 43 of Section 2.